US012703455B2

(12) United States Patent
Weinmann et al.

(10) Patent No.: US 12,703,455 B2
(45) Date of Patent: Aug. 11, 2026

(54) METHOD AND DEVICE FOR ACTIVATING A DRIVE OF A PEDAL-OPERATED VEHICLE

(71) Applicant: Robert Bosch GmbH, Stuttgart (DE)

(72) Inventors: Matthias Weinmann, Balingen (DE); Daniel Baumgaertner, Tuebingen (DE); Merlin Martin Manewald, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 17/790,708

(22) PCT Filed: Jan. 11, 2021

(86) PCT No.: PCT/EP2021/050325
§ 371 (c)(1),
(2) Date: Jul. 1, 2022

(87) PCT Pub. No.: WO2021/140238
PCT Pub. Date: Jul. 15, 2021

(65) Prior Publication Data
US 2023/0051464 A1 Feb. 16, 2023

(30) Foreign Application Priority Data
Jan. 10, 2020 (DE) .................... 10 2020 200 227.4

(51) Int. Cl.
*B62M 6/50* (2010.01)

(52) U.S. Cl.
CPC .................................... *B62M 6/50* (2013.01)

(58) Field of Classification Search
CPC . B62M 6/50; B62M 6/45; B62M 6/40; B62M 6/55; B62J 43/13; B62J 45/411; B62J 45/413; B60L 50/20
See application file for complete search history.

(56) References Cited

U.S. PATENT DOCUMENTS 5,368,122 A 11/1994 Chou
2014/0166385 A1* 6/2014 Arimune ............... B62J 45/421
180/206.3

(Continued)

FOREIGN PATENT DOCUMENTS

DE 102014115716 A1 4/2015
DE 102015015496 A1 6/2016

(Continued)

OTHER PUBLICATIONS

Machine Translation: JP-2018024416-A (Year: 2018).*

(Continued)

*Primary Examiner* — Anne Marie Antonucci
*Assistant Examiner* — Connor L Knight
(74) *Attorney, Agent, or Firm* — Norton Rose Fulbright US LLP

(57) ABSTRACT

A method and a device for controlling an additional electric or motor drive of a vehicle that can be driven at least partially by the rider using a pedal drive. To derive the control of the drive, at least one first rotational movement variable is detected that represents the rotational movement of the pedals or the pedaling movement of the crank performed by the rider. The first rotational movement variable can be detected by one or more sensors. The drive is controlled or regulated dependent on a second rotational movement variable that is derived from the first rotational movement variable. At least one time constant that influences the follow-up time of the actuated or regulated drive is taken into consideration in addition to the first rotational movement that represents the pedaling movement of the rider. The time constant used may be varied to calculate the second rotational movement variable.

20 Claims, 2 Drawing Sheets

(56) References Cited

U.S. PATENT DOCUMENTS

| | | | | |
|---|---|---|---|---|
| 2015/0057855 | A1* | 2/2015 | Stegmaier | B62M 6/45 701/21 |
| 2017/0001682 | A1* | 1/2017 | Hayslett | B62M 6/50 |
| 2017/0151998 | A1* | 6/2017 | Negoro | B62M 6/55 |
| 2019/0193810 | A1* | 6/2019 | Tsuchizawa | B62M 6/45 |
| 2021/0122444 | A1* | 4/2021 | Yang | B62M 6/50 |

FOREIGN PATENT DOCUMENTS

| | | | | |
|---|---|---|---|---|
| DE | 102017213952 | A1 | 2/2018 | |
| DE | 102018218178 | A1 | 5/2019 | |
| DE | 102019106586 | A1 | 9/2019 | |
| DE | 102019106422 | A1 | 10/2019 | |
| EP | 2840017 | A1 | 2/2015 | |
| JP | H1059262 | A | 3/1998 | |
| JP | 2000103383 | A * | 4/2000 | |
| JP | 2018024416 | A * | 2/2018 | B62M 6/45 |

OTHER PUBLICATIONS

Machine Translation: JP-2000103383-A (Year: 2000).*

International Search Report for PCT/EP2021/050325, Issued Mar. 29, 2021.

* cited by examiner 100
120
torque sensor
control unit
drive
160
pedaling rate sensor
130
110
memory
140
further sensors
150

200
ascertain rider's torque
300
detect further actuating variable
320
compare
310
low pass filter
330
determine offset correction factor
350
sum
340
output module

METHOD AND DEVICE FOR ACTIVATING A DRIVE OF A PEDAL-OPERATED VEHICLE

FIELD

The present invention relates to a method and a device for activating an auxiliary drive of a vehicle that is otherwise driven by the rider by means of pedals.

BACKGROUND INFORMATION

The support provided by a, for the most part electrically operated, drive of an electric bicycle is usually dependent on the pedaling frequency or the pedaling torque of the rider. In this case, the propulsion is controlled by the drive corresponding to the pedaling speed or the pedaling force. Due to the circular movement of the crank and also the mostly non-uniform pedaling movement of the rider, thus for the activation a measured variable that fluctuates about the time average is detected, on the basis of which measured variable the support by the drive is controlled or regulated. In particular in the case of the pedaling force, the measured variable torque takes the form of a highly undulating sine curve.

If the support by the drive were to be regulated without a time delay directly dependent on the highly undulating sine curve thus detected, a similarly non-uniform supporting drive torque or motor torque would result that would additionally be added to the propulsion generated by the rider. The result would be a sometimes jerky reaction and movement of the electric bicycle. Furthermore, there are further disadvantages with direct derivation of the drive torque of this kind in climbs. Thus for example when a dead center of the pedal position is reached (one pedal right at the top, the other right at the bottom) the situation may arise that no or only a very low torque is applied on the chain ring and hence on the driving rear wheel, as a result of which the speed decreases and may possibly force the rider to stop or dismount.

For this reason, the activation and the operation of the drive takes place by means of a follow-up time constant dependent on the detected (undulating) rider's torque on the pedals. Depending on the selected time constants, this method however results in inertia in the system, which could be disadvantageous in certain driving situations. Thus it may happen that if an overly long time constant is selected, for example when starting or in the case of dynamic pedaling, the desired support is implemented only with a delay.

The present invention is provides a solution for adapting the time constant and hence the follow-up time of the drive suitably to the driving situation.

SUMMARY

According to the present invention, a method and a device are provided for controlling an additional electric or motor drive of a vehicle that can be driven at least partially by the rider by means of a pedal drive. Here, a vehicle is to be understood to mean any kind of vehicle that has a crank that is actuated by the rider, such as an electric bicycle for example. In order to derive the control of the drive, at least one first rotational movement variable is detected that represents the rotational movement of the pedals or the pedaling movement of the crank performed by the rider, in particular the change therein over time. The first rotational movement variable can be detected by means of an individual sensor or by taking sensor variables of multiple sensors together. The drive is then controlled or regulated dependent on a second rotational movement variable that is derived from the first rotational movement variable. To derive the second rotational movement variable, at least one time constant that influences the follow-up time of the actuated or regulated drive is taken into consideration in addition to the first rotational movement variable, which represents the pedaling movement of the rider. A feature of an example embodiment of the present invention is that the second rotational movement variable that is derived from the first rotational movement variable is compared with the original first rotational movement variable. Depending on the result of this comparison, the time constant used is then varied to calculate or generate the second rotational movement variable.

An advantage of such a procedure for deriving the activation or regulation of the drive is that different time constants can be used for the second rotational movement variable dependent on the result of the derivation. Thus in the case of an overly great difference between the two rotational movement variables the time constant can be increased or decreased in order to speed up or slow down the reaction of the drive to the propulsion of the vehicle. This is useful particularly in the case of starting situations or uphill or downhill travel.

In one configuration of the present invention, the second rotational movement variable is generated by means of low pass filtering or smoothing of the first rotational movement variable. In such case, first-order low pass filtering can be used.

In accordance with an example embodiment of the present invention, the variation of the time constant may lie between two in particular specified end values and be continuously changeable. It is however alternatively also possible for fixed time constants to be specified, so that the method can choose between at least two time constants. The specification of the time constants may also be stored in a database to which the method has access. The time constants may be selected solely based on the comparison or may be selected in conjunction with additional criteria, for example taking into consideration further operating data or vehicle-dynamics parameters.

To implement the present invention, a first time constant may be selected if the first rotational movement variable exceeds a threshold value. Otherwise a second time constant is selected. In such case it may be that the first time constant is smaller than the second time constant, in particular smaller by an order of magnitude.

The threshold value may in this case be selected dependent on the second rotational movement variable. In the simplest case, the threshold value corresponds to the second rotational movement variable. By this selection of the threshold value it can be recognized that the rider exerts a greater pedaling demand on the pedals than would be provided by the derivation of the control of the drive.

One further possible way of establishing the threshold value is to scale the second rotational movement variable with a scaling factor or to add a fixed or variable value to the second rotational movement variable. With the scaling it is possible for example in the case of low pedaling demands, i.e. low first rotational movement variables, to achieve greater sensitivity to the change in the time constant and hence in the control of the drive, whereas in the case of a high pedaling demand, i.e. high first rotational movement variables, a greater change in the pedaling demand is necessary in order to achieve a change in the activation. The situation is similar when using a variable value that is added to the second rotational movement variable to establish the threshold value. When using an absolute or fixed value for adding to the second rotational movement variable, on the other hand, a reverse effect is to be expected, since this fixed value is relatively less crucial in the case of higher second rotational movement variables than in the case of lower second rotational movement variables.

Advantageously, the scaling factor or the absolute or variable value can be specified dependent on operating variables of the vehicle or of vehicle-dynamics sensor variables, in particular those sensor variables that are generated or can be influenced by the rider. It is possible in such case to consider the speed or the acceleration of the bicycle, the lateral inclination, the pitch angle, the yaw rate, but also the mass of the bicycle or the rider and/or the pedaling speed or pedaling frequency.

Furthermore, it is possible for at least two threshold values to be used, in which in each case different scaling factors or absolute or variable values modify the underlying second rotational movement variable. In this case, a separate time constant would be able to be selected for attaining or exceeding each threshold value. Thus for example third, fourth or fifth time constants could be provided that each generate different follow-up times in the activation of the drive. Alternatively or additionally, the time constant used may be established dependent on the first or second rotational movement variable.

Additionally the generation of the second rotational movement variable, by means of which the activation of the drive is derived, may take into consideration a further actuating variable of the pedals by the rider. Of course, the pedal actuation may also be taken into consideration only once the control is derived from the second rotational movement variable.

Furthermore, it is possible for at least one of the time constants used to be varied likewise dependent on the actuating variable of the pedals.

The actuating variable may be used to apply an offset to the second rotational movement variable. Additionally, the offset may also be selected dependent on the specified time constant.

The first rotational movement variable may represent both a torque that the rider exerts on the pedals and the pedaling frequency or cadence generated by the rider. Correspondingly, the actuating variable may represent the respective other physical variable exerted or generated by the rider.

Further advantages will become apparent from the following description of example embodiments of the present invention and the figures.

DETAILED DESCRIPTION OF EXAMPLE EMBODIMENTS

Figures 1, 2:
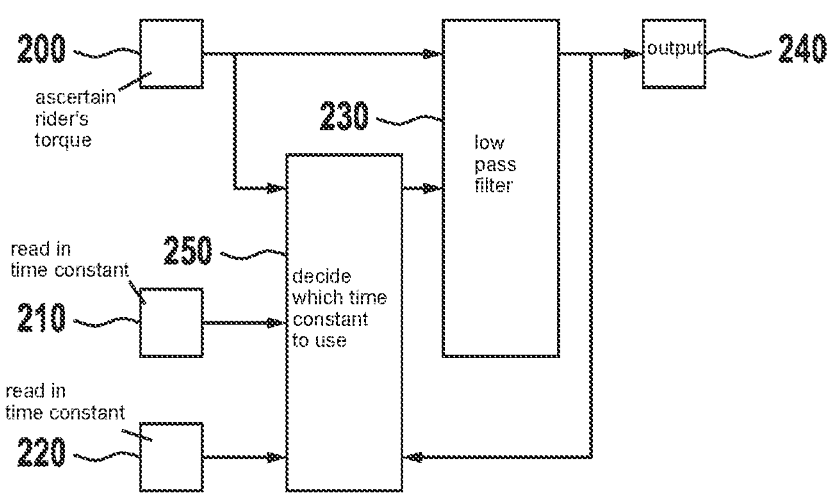
FIG. 1 schematically shows the structure of a device that carries out the method according to an example embodiment of the present invention.
FIG. 2 schematically illustrates how a first embodiment of the present invention is carried out.

As already stated at the beginning, the activation of the additional drive of a pedal-operated vehicle, for example an electric bicycle, usually takes place dependent on the actuation of the pedals by the rider. In so doing, both the pedaling frequency or the pedaling speed and the force of the actuation in the form of the rider's pedaling torque can be used as a measurement of the desired support by the additional propulsion of the provided drive.

In accordance with the present invention, a method and a device are now also to be described that improve the adaptation of the support by the (auxiliary) drive 160 dependent on the rider's input. For this purpose, a control unit 100 of a corresponding device, for example a human-machine interface (HMI), as is customary for controlling the electric drive, detects various sensor variables and actuates the drive 160 based on these sensor variables. In such case, the control unit 100 may have a memory 110 in which are stored corresponding databases or variables that are relevant to the control. To carry out the derivation of the activation, the control unit 100 detects the rider's input or the actuation of the pedals by the rider. This can be achieved by using a torque sensor 120, but also by using a pedaling frequency sensor 130 on the crank of the bicycle. Furthermore, further sensors 140 and/or 150 that detect vehicle-dynamics variables or operating variables may be attached to the vehicle, bicycle or rider. In such case, reference is made, among other things, to sensors for detecting the speed, the acceleration, the yaw rate, the lateral inclination, the road gradient, but also the heart rate. Furthermore, it may also be possible to detect the surroundings of the vehicle or the bicycle, for example using video sensors or ultrasound, in order for example to detect other road users or obstructions on the route.

Starting from the sensor variables relating to the actuation of the crank by the rider that are thus obtained, the control unit can actuate the drive in such a way that additional propulsion is generated in addition to the propulsion generated by the rider by his pedaling force. In such case, a level of support, i.e. intensification of the rider's input, may be specified, or selected by the rider. Additionally, the support can be adapted by additional information on the vehicle dynamics and the operating or ambient parameters.

In a first embodiment according to FIG. 2, first of all the rider's torque M_in applied or generated by the rider is ascertained in a step 200 or a module based on the detected sensor variables. Typically in such case this is a first rotational movement variable, which is detected directly or indirectly by a torque sensor 120 on the crank of the bicycle. Alternatively, the pedaling frequency can also be used here in order to derive from it a value for the current rider's input. The first rotational movement variable thus ascertained is supplied to a low pass 230, which by way of a time constant T generates a second rotational movement variable M_out and outputs it by way of an output 240. This second rotational movement variable is used to derive the control of the drive 160. With the present invention, the establishing of the time constants T will now be described. For this purpose, in the simplest case two time constants T_up and T_down are provided, which are read in correspondingly via steps 210 and 220, for example from the memory 110. Together with the detected first rotational movement variable M_in and the second rotational movement variable arising from an earlier determination, a decision is taken in step 250 as to which of the specified time constants T_up or T_down is used for the low pass filtering in step 230. For this purpose, a comparison of the second rotational movement variable with the first rotational movement variable takes place in step 250. In the event that the first rotational movement variable M_in >M_out, i.e. if the current pedaling demand of the rider is higher than the basis for the control of the drive provided, filtered by the low pass, the specified time constant T_up is selected, otherwise it is the further specified time constant T_down. By selecting the time constant T_up to be lower than the time constant T_down, the reaction of the drive to a change in the rider's input can thus be speeded up. Typically, in this case the time constant T_up is considerably smaller than the time constant T_down, for example at least by one order of magnitude. Optionally, multiple time constants may also be available to choose from, for example by using multiple threshold values starting from a comparison of the first and second rotational movement variables.

Furthermore, the time constants may be taken or selected from a database dependent on vehicle-dynamics variables or operating variables and also rider's parameters. Alternatively or optionally, the time constants may also assume continuous values between two extreme values that are selected, established or determined depending on further boundary conditions such as vehicle-dynamics variables or operating variables.

Figure 3:
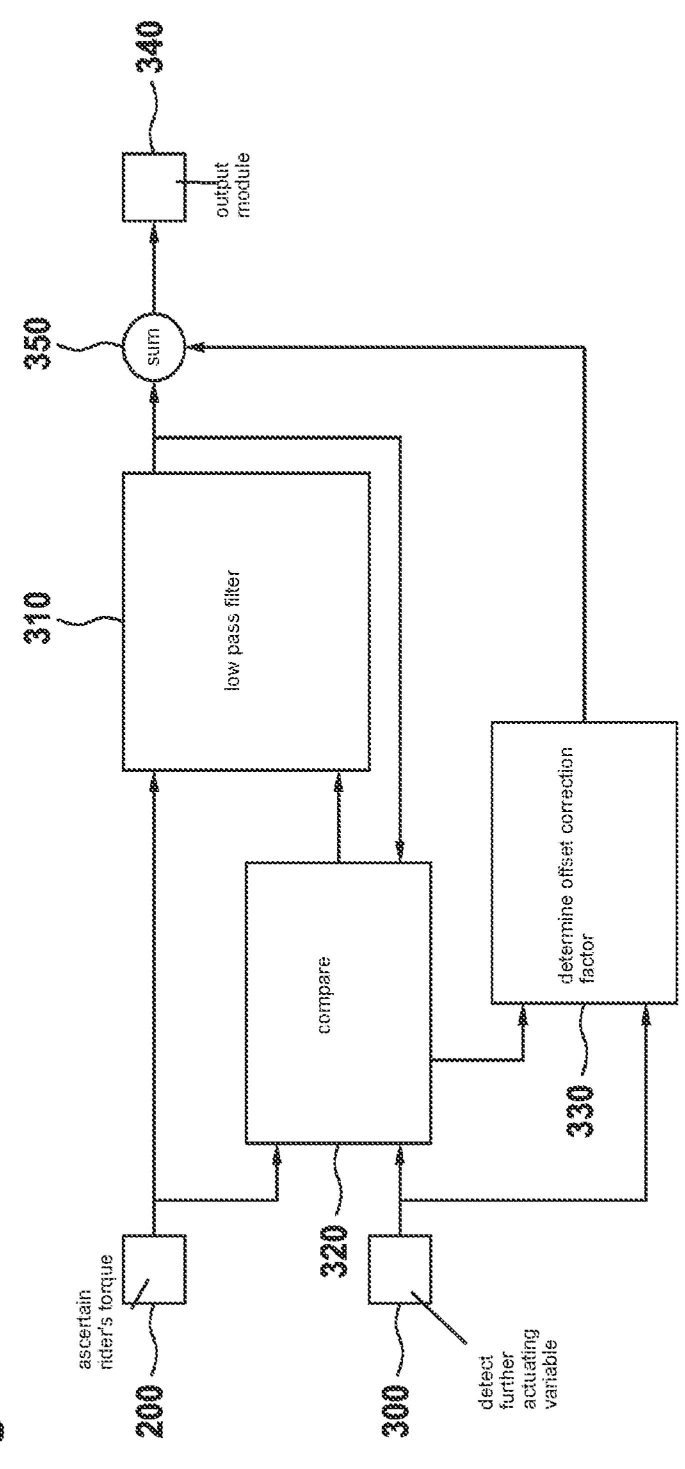
FIG. 3 shows a second embodiment of the present invention.

In the second embodiment of FIG. 3, an additional actuating variable of the crank is to be used in order to improve the derivation of the second rotational movement variable and thus provide the rider with an improved ride feel.

For this purpose, just as in the first embodiment, in a first step 200 the rider's torque M_in is ascertained and processed in a low pass filter 310. The result of the low pass filter 310 is made available to a summing unit 350 that makes the modified second rotational movement variable M_out available to an output module 340. As already explained in the first embodiment, the result of the low pass filter 310 is made available to a step 320 for comparison of the rotational movement variables M_in and M_out. Additionally, the step 320 detects a further actuating variable of the pedals that is detected in a corresponding step 300. In the present second embodiment, the pedaling frequency or cadence of the rider can be detected as a second actuating variable. The actuating variable may additionally be used in step 320 in order to determine, select or vary the time constant or to select the corresponding time constant from a specified number of at least two time constants. The result of the comparison in step 320 is made available both to the low pass filter 310 corresponding to the first embodiment and to step 330 for ascertaining an offset correction factor. To determine the offset correction factor in step 330, the actuating variable from step 300 and also the selected, specified or determined time constant T from step 320 is additionally used. The offset correction factor thus ascertained is then passed to the summing unit 350 in order to generate the modified rotational movement variable M_out, which for its part supplies the basis for the activation of the drive.

By determining an offset correction factor, different time constants for the increasing and decreasing input torques can be taken even better into consideration. By using a further variable that represents the pedaling behavior of the rider, thus the difference between the time constants for increasing and decreasing input torques can be compensated.

Furthermore, by a correction factor of this kind the activation can be set to be more sensitive for low pedaling frequencies, whereas at a high pedaling frequency the system reacts more sluggishly.

In a further embodiment of the present invention, in step 330 a scaling factor may be derived that in a step 360 instead of the summing unit is applied to the second rotational movement variable generated by the low pass filter 310. In this case, the scaling factor may likewise, in addition to the time constants, be determined dependent on vehicle-dynamics variables, operating variables or rider parameters.

What is claimed is:

1. A method for controlling a drive of a pedal-powered vehicle, the method comprising the following steps:

detecting, using at least one first sensor, a first rotational movement variable that represents a rotational movement of pedals by the rider;

generating a second rotational movement variable dependent on the first rotational movement variable and a time constant, the time constant determining a follow-up time of the drive;

varying the time constant dependent on a comparison of the second rotational movement variable with the first rotational movement variable; and controlling the drive to provide propulsion to the pedal-powered vehicle based on the second rotational movement variable, wherein for the varying of the time constant, a first time constant is selected when the first rotational movement variable is greater than a threshold value that is established dependent on the second rotational movement variable, and a second time constant is selected when the first rotational movement variable is less than or equal to the threshold value, the first time constant being different than the second time constant.

2. The method as recited in claim 1, wherein the pedal-powered vehicle is an electric bicycle.

3. The method as recited in claim 1, wherein the second rotational movement variable is generated by low pass filtering of the first rotational movement variable.

4. The method as recited in claim 1, wherein dependent on the comparison of the second rotational movement variable with the first rotational movement variable, the time constant is varied at least between a first and a second time constant, the at least first and second time constants being are specified.

5. The method as recited in claim 1, wherein, the first time constant being less than the second time constant.

6. The method as recited in claim 5, wherein the threshold value corresponds to the second rotational movement variable generated.

7. The method as recited in claim 5, wherein the threshold value is established by: (i) scaling the second rotational movement variable with a scaling factor, or (ii) adding an absolute or variable value to the second rotational movement variable, wherein (i) the scaling factor, or (ii) the absolute or variable value, is specified dependent on a vehicle-dynamics sensor variable or an operating variable of the vehicle.

8. The method as recited in claim 1, wherein the second rotational movement variable is generated additionally dependent on an actuating variable that represents an actuation of the pedals by the rider.

9. The method as recited in claim 8, wherein the time constant is varied dependent on the actuating variable.

10. The method as recited in claim 8, wherein the second rotational movement variable is modified with an offset, the offset being established dependent on the actuating variable and the time constant.

11. The method as recited in claim 8, wherein the first rotational movement variable or the actuating variable represents a torque that the rider exerts on the pedals.

12. The method as recited in claim 8, wherein the first rotational movement variable or the actuating variable represents a pedaling frequency that is generated by the rider when pedaling.

13. A device for controlling a drive of a pedal-powered vehicle, comprising a control unit is configured to:

detect, using at least one first a first rotational movement variable that represents the rotational movement of the pedals by the rider;

generate a second rotational movement variable dependent on the first rotational movement variable and a time constant, the time constant determining a follow-up time of the drive;

wherein the control unit is configured to carry out a comparison of the second rotational movement variable with the first rotational movement variable, and to vary the time constant dependent on the comparison; and control the drive to provide propulsion to the pedal-powered vehicle based on the second rotational movement variable, wherein for the varying of the time constant, a first time constant is selected when the first rotational movement variable is greater than a threshold value that is established dependent on the second rotational movement variable, and a second time constant is selected when the first rotational movement variable is less than or equal to the threshold value, the first time constant being different than the second time constant.

14. The device as recited in claim 13, wherein the pedal-powered vehicle is an electric bicycle.

15. A method for controlling a drive of a pedal-powered vehicle, the method comprising the following steps:

detecting, using at least one first sensor, a first rotational movement variable that represents a rotational movement of pedals by the rider;

generating a second rotational movement variable dependent on the first rotational movement variable and a time constant, the time constant determining a follow-up time of the drive;

varying the time constant dependent on a comparison of the second rotational movement variable with the first rotational movement variable to obtain a first variation of the time constant;

further varying the time constant dependent on an actuating variable different from the first rotational movement variable, the actuating variable representing at least one of a torque that the rider exerts on the pedals and a pedaling frequency that is generated by the rider when pedaling to obtain a second variation of the time constant; and controlling the drive based on the second rotational movement variable.

16. The method as recited in claim 15, wherein the second rotational movement variable is generated by low pass filtering of the first rotational movement variable.

17. The method as recited in claim 15, wherein for the varying of the time constant, a first time constant is selected when the first rotational movement variable is greater than a threshold value that is established dependent on the second rotational movement variable, and a second time constant is selected when the first rotational movement variable is less than or equal to the threshold value, the first time constant being different than the second time constant, wherein the threshold value corresponds to the second rotational movement variable generated.

18. A method for controlling a drive of a pedal-powered vehicle, the method comprising the following steps:

detecting, using at least one first sensor, a first rotational movement variable that represents a rotational movement of pedals by the rider;

generating a second rotational movement variable dependent on the first rotational movement variable and a time constant, the time constant determining a follow-up time of the drive;

varying the time constant dependent on a comparison of the second rotational movement variable with the first rotational movement variable; and controlling the drive based on the second rotational movement variable, wherein the second rotational movement variable is modified with an offset, the offset being established dependent on the time constant and an actuating variable that represents at least one of a torque that the rider exerts on the pedals and a pedaling frequency that is generated by the rider when pedaling.

19. The method as recited in claim 18, wherein the second rotational movement variable is generated by low pass filtering of the first rotational movement variable.

20. The method as recited in claim 18, wherein for the varying of the time constant, a first time constant is selected when the first rotational movement variable is greater than a threshold value that is established dependent on the second rotational movement variable, and a second time constant is selected when the first rotational movement variable is less than or equal to the threshold value, the first time constant being different than the second time constant, wherein the threshold value corresponds to the second rotational movement variable generated.

* * * * *